UNITED STATES PATENT OFFICE 2,587,442

COPOLYMERS OF MALEIC ANHYDRIDE WITH ALLYL ESTERS OF ALKYLI-DENE-BIS-AROMATIC CARBONATES

Earl J. Carlson, Akron, Ohio, assignor to The B. F. Goodrich Company, New York, N. Y., a corporation of New York No Drawing. Application February 14, 1947, Serial No. 728,726

3 Claims. (Cl. 260—77.5)

This invention relates to a class of hard, clear, non-thermoplastic, resinous copolymers and pertains more particularly to copolymers of maleic anhydride and polyallyl compounds.

It is known that polyallyl compounds polymerized to form hard, clear, resinous products, but this polymerization proceeds slowly and the final product often does not have the desired hardness.

I have now discovered that these difficulties can be overcome by copolymerizing the polyallyl compounds with maleic anhydride. This polymerization takes place much more rapidly than when the polyallyl compound alone is polymerized, and the resulting product is harder than that obtained when the polyallyl compound is polymerized alone.

The monomers which may be polymerized with maleic anhydride in the practice of this invention are those organic compounds comprising a plurality of alkenyl radicals, each of which contains at least three carbon atoms and possesses a methylene ($CH_2$) group attached by a double bond to a carbon atom, which is in turn attached to another methylene group. Examples of such radicals include the allyl

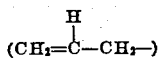

and beta-alkyl substituted allyl radicals such as methallyl

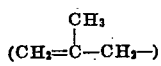

For example, polyallyl esters of polybasic acids such as diallyl carbonate, diallyl oxalate, diallyl malonate, diallyl succinate, diallyl glutarate, diallyl adipate, diallyl pimelate, diallyl suberate, diallyl azelate, diallyl sebacate, diallyl maleate, diallyl phthalate and the like, and the corresponding dimethallyl esters such as dimethallyl carbonate, dimethallyl oxalate, dimethallyl malonate, dimethallyl succinate, dimethallyl glutarate, dimethallyl adipate, dimethallyl pimelate, dimethallyl suberate, dimethallyl azelate, dimethallyl sebacate, dimethallyl maleate, dimethallyl phthalate, and the like, may be used in this invention. Similarly, polyallyl or polymethallyl esters of polyhydroxy compounds esterified with polybasic acids, and particularly the diallyl carbonate esters having the formula

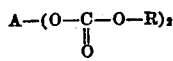

wherein A is a bivalent hydrocarbon radical, or halogen or ether-substituted hydrocarbon radical, and R is allyl or methallyl, such as diallyl ethylene glycol dicarbonate, diallyl diethylene glycol dicarbonate, diallyl hydroquinone dicarbonate, diallyl resorcinol dicarbonate, and the like may also be utilized.

Other compounds of this class which form particularly useful copolymers with maleic anhydride include the polyallyl or polymethallyl carbonate esters of bis phenols and halogenated bis phenols. Included among these compounds are 2,2-bis(4-allyl carbonato-3-chlorophenyl) propane, 2,2-bis(4-allyl carbonato-3,5-dichlorophenyl) propane, 2,2-bis(4-allyl carbonato phenyl) propane, 1,2-bis(4-allyl carbonato phenyl) ethane, and other compounds of the general formula

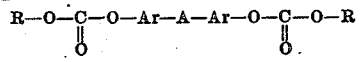

wherein R is an alkenyl radical of the type described, such as allyl or methallyl; Ar is a bivalent aromatic radical having its connecting valences on nuclear carbon atoms, such as an arylene or nuclear halogenated arylene radical or the like; and A is an alkylidene radical preferably having each of its connecting valences on the same carbon atom.

The monomers to be copolymerized with maleic anhydride may also be polyallyl or polymethallyl ethers such as diallyl ether, dimethallyl ether and the like, polyallyl or polymethallyl amides such as diallyl guanidine dicarboxylate, diallyl cyanamide dicarboxylate, diallyl urea dicarboxylate, and triallyl tricarboxy hydroxylamine.

In addition polyallyl esters of inorganic acids such as diallyl sulfate, di- or triallyl phosphate, di- or triallyl borate, and even polyallyl or polymethallyl hydrocarbon compounds such as diallyl, dimethallyl, and p-diallyl benzene and the like, may be copolymerized with maleic anhydride.

In the practice of the invention one or more of the above polyallyl or polymethallyl compounds is mixed with maleic anhydride in such proportion that the mixture contains, for each mole of the polyallyl or polymethallyl compound, an amount of maleic anhydride between .1 mole and the number of moles which is equal to the number of allyl or methallyl radicals in the compound. If the polyallyl compound contains two allyl groups, this means that as much as two moles of maleic anhydride may be polymerized with one mole of the polyallyl compound. Since maleic anhydride does not polymerize with its own kind of end groups there is an excess of anhydride present in such instances when its concentration exceeds a molar ratio of 2 to 1. On the other hand, when polyallyl compounds containing 3 or 4 allyl groups are used, the maximum mole percentage of maleic anhydride available for polymerization will correspond to a molar ratio of 3 to 1 or 4 to 1, respectively.

The mixture is then polymerized by heating at temperatures from 25° C. to 150° C. and preferably at 50° C. to 100° C. in the presence of a polymerization catalyst, or in solution in an organic solvent or in aqueous emulsion or in any other desired manner.

The following table contains a number of specific examples of copolymers of maleic anhydride and 2,2-bis-(4-allyl carbonato-3,5-dichlorophenyl) propane; prepared by varying the mole percentage of maleic anhydride from 0 to 75. The copolymers were prepared by heating mixtures of the dicarbonate ester with various proportions of maleic anhydride for 24 hours at 75° C. and in the presence of 1 percent by weight of benzoyl peroxide; and the gel time, (the time required for the liquid mixture to be transformed into a solid gel) and the Barcol Impressor hardness of the final product were measured, and are included in the table:

| Example | Mole Per Cent Maleic Anhydride | Weight Per Cent Maleic Anhydride | Gel Time (Minutes) | Barcol Impressor Hardness |
| --- | --- | --- | --- | --- |
| I | 0 | 0 | 145 | 26 |
| II | 10 | 2.2 | 130 | 32 |
| III | 15 | 3.7 | 80-95 | 37 |
| IV | 20 | 5.0 | 37-55 | 38 |
| V | 25 | 6.7 | 30-37 | 40 |
| VI | 30 | 8.2 | 30-37 | 42 |
| VII | 35 | 10.2 | 30-37 | 42 |
| VIII | 40 | 12.3 | 30-37 | 43 |
| IX | 45 | 14.7 | 30-37 | 43 |
| X | 50 | 17.3 | 30-37 | 43 |
| XI | 55 | 20.6 | 30-37 | 44 |
| XII | 60 | 24.0 | (¹) | 44 |
| XIII | 65 | 28.1 | (¹) | 45 |
| XIV | 70 | 32.9 | (¹) | 45 |
| XV | 75 | 38.7 | (¹) | ²45 |

¹ Less than 30.
² Excess maleic anhydride present on surface of copolymer.

The above table shows that as the amount of maleic anhydride is increased, the rate of polymerization increases. It also shows the increase in hardness obtained by increasing the percentage of maleic anhydride and the effect of using an amount of maleic anhydride in excess of a molar ratio of 2 to 1.

The catalyst that is used in the polymerization may be any of the usual polymerization catalysts, preferably a peroxygen compound such as hydrogen peroxide, silver peroxide, sodium persulfate, the perborates, the percarbonates, benzoyl peroxide, caproyl peroxide, lauroyl peroxide, acetone peroxide, acetyl benzoyl peroxide and other organic peroxides and the like. It was found that the quantity of the catalyst can be varied considerably, depending on the particular qualities desired in the final polymerized product. When more than three percent of the catalyst is used, this tends to color the resulting copolymer slightly, and consequently when clear products are desired the percentage of the catalyst should be kept below 3, and preferably from 0.1 to 1.0 percent, but where the slight color effect is not serious, percentages as high as five and even higher, may be utilized.

The products of the polymerization are transparent, non-thermoplastic copolymers which are generally colorless unless a large amount of catalyst is used, as heretofore explained in which case a slight reddish tinge is imparted to the product. Rigid sheets may be cast which show outstanding resistance to chemicals, abrasion, craze, and distortion under heat, and fully cured sheets can be formed at elevated temperatures into severe simple curvatures or into moderate compound curvatures.

The unusual and very desirable feature of extremely low shrinkage during the polymerization reaction is obtained when the polyallyl or polymethallyl carbonate esters of bis-phenols and halogenated bis-phenols are polymerized with maleic anhydride. This property, of course, renders the materials extremely valuable for use as molding resins of the thermosetting variety, making it possible to produce molded objects of accurate dimensions free from strain, in contrast to other unsaturated polyesters which shrink as much as 15 to 25% or more during the polymerization reaction, and consequently find no application for this purpose.

The very desirable feature of great affinity for glass is obtained when the various monomers listed hereinabove are polymerized with maleic anhydride. Amounts as small as 5% by weight or even smaller of the maleic anhydride produce a product which exhibits very good adhesion to glass, and by increasing the percentage of maleic anhydride it is possible to obtain even better adhesion. This feature renders the copolymers readily adaptable for use as an adhesive for bonding glass to itself, or to metals, rubber, canvas, wood, and other materials.

Among the other outstanding characteristics possessed by these copolymers are their good electrical properties, and their capability of being cured without pressure.

These copolymers are also suitable for many uses in the field of laminated products. For example, products of great strength may be secured by impregnating fibrous sheets of paper, linen, canvas, etc. with the polymerizable mixtures herein described, forming a laminated product, and then curing or polymerizing the same. The following is an example of the preparation of a laminate: A heavy grade of paper was impregnated and plied up to 8 layers with a mixture containing 50 mole percent maleic anhydride and the remainder 2,2-bis-(4-allyl carbonato, 3,5-dichlorophenyl) propane. Such a mixture gels in three minutes when catalyzed with 3% benzoyl peroxide. A laminate having a Barcol Impressor hardness of 35 was obtained after curing between glass plates for only ten minutes at 140° C.

In addition to the specific examples listed in the table hereinabove, further examples are given below to illustrate the increased rate of polymerization obtained by copolymerizing maleic anhydride with compounds of the type listed above. In Examples XVI and XVII a comparision is shown between the rates of polymerization of a mixture of 2,2-bis-(4-allyl carbonato-3,5-dichlorophenyl) propane and 2,2-bis-(4-acrylyl-3,5-dichlorophenyl) propane (a rapidly polymerizable material) and this same mixture with maleic anhydride added.

Example XVI 90 parts by weight of 2,2-bis-(4-allyl carbonato-3,5-dichlorophenyl) propane and 10 parts by weight of 2,2-bis-(4-acryly-3,5-dichlorophenyl) propane were polymerized at 75° C. using 0.25 part by weight of benzoyl peroxide as catalyst. The gel time was 125 minutes.

The same monomers were then copolymerized with 50 mole percent of maleic anhydride using 0.25 part by weight of benzoyl peroxide. In this case the gel time was reduced to only 68 minutes.

Example XVII 80 parts by weight of 2,2-bis-(4-allyl carbonato-3,5-dichlorophenyl) propane and 20 parts by weight of 2,2-bis-(4-acrylyl-3,5-dichlorophenyl) propane were polymerized at 75° C. using 0.5 part by weight of benzoyl peroxide as catalyst. The gel time was 42 minutes.

These same monomers were then copolymerized with 50 mole percent of maleic anhydride. The gel time was reduced to only 20 minutes.

It is thus apparent from Examples XVI and XVII that the presence of maleic anhydride increases the rate of polymerization of mixtures of polyallyl compounds with other polymerizable materials. When the diacrylate used in these examples is polymerized in admixture with maleic anhydride in the absence of the diallyl ester, however, the rate of polymerization is not appreciably improved.

Other polymerizable materials, in addition to the diacrylate mentioned in Example XVI and XVII, which may be present together with the polyallyl compound and maleic anhydride include vinyl esters such as vinyl acetate, styrene, esters of acrylic and methacrylic acids, butadiene-1,3 and the like. Mixtures of more than one polyallyl compound may also of course be used.

In Example XVIII a comparison of gel times obtained by polymerizing the diallyl dicarbonate ester of diethylene glycol alone and with maleic anhydride is shown and in Example XIX a similar comparison is shown between polymerizing the diallyl dicarbonate ester of diethanol amine alone and with maleic anhydride.

Example XVIII

The diallyl dicarbonate ester of diethylene glycol was polymerized at 75° C. and in the presence of 1% benzoyl peroxide. The gel time was greater than three hours and the Barcol Impressor hardness after curing for 24 hours was zero.

This same monomer was then polymerized with 26.3 mole percent of maleic anhydride at 75° C. and in the presence of 1% benzoyl peroxide. The gel time in this case was only 15 minutes and the Barcol Impressor hardness after 24 hours cure was from 26–35.

Example XIX

The diallyl dicarbonate ester of diethanol amine was polymerized at 75° C. and in the presence of 1% benzoyl peroxide. The gel time was greater than three hours and the Barcol Impressor hardness after 24 hours cure was zero.

This same monomer was then polymerized with 25.0 mole percent of maleic anhydride at 75° C. and in the presence of 1% benzoyl peroxide. The gel time in this case was less than 15 minutes and the Barcol Impressor hardness after 24 hours cure was 48–49.

Similar improvements in polymerization rate are secured when the other polyallyl esters listed hereinabove are copolymerized with maleic anhydride. For example, diallyl adipate, triallyl aconitate, diallyl maleate, diallyl phthalate and similar polyallyl esters of polybasic acids polymerize to hard non-thermoplastic resins but require a rather long polymerization time. Copolymerization of these esters with maleic anhydride, however, speeds up the polymerization rate and produces valuable copolymers.

Although specific examples of the invention have been herein described, it is not intended to limit the invention solely thereto, but to include all of the variations and modifications falling within the spirit and scope of the appended claims.

I claim:

1. In the method of transforming a liquid ester of the formula $$R-O-\underset{\underset{O}{\|}}{C}-O-Ar-A-Ar-O-\underset{\underset{O}{\|}}{C}-O-R$$

wherein each R is an alkenyl radical containing from 3 to 4 carbon atoms and possessing a methylene group attached by a double bond to a carbon atom in turn attached to another methylene group, Ar is a bivalent aromatic radical having its connecting valences on nuclear carbon atoms, and A is an alkylidene radical, into a solid, infusible polymeric material by the steps which comprise adding an organic peroxide catalyst and heating until gel formation occurs, the improvement which consists in adding to said liquid ester prior to the addition of the peroxide catalyst, an amount of maleic anhydride such that the mixture contains for each mole of said liquid ester an amount of maleic anhydride between 0.1 and 2 moles, thereby substantially to decrease the time required for gel formation to occur, and substantially to decrease shrinkage during the polymerization reaction, while obtaining greatly increased hardness and strength in the resulting polymeric material.

2. The method of claim 1 wherein each R in the liquid ester is an allyl radical.

3. The method of claim 2 wherein the liquid ester utilized is 2,2-bis-(4-allyl carbonato-3,5-dichlorophenyl) propane.

EARL J. CARLSON.

REFERENCES CITED

The following references are of record in the file of this patent:

UNITED STATES PATENTS

| Number | Name | Date |
| --- | --- | --- |
| 2,340,110 | D'Alelio | Jan. 25, 1944 |
| 2,370,589 | Strain et al. | Feb. 27, 1945 |
| 2,373,067 | Thomas et al. | Apr. 3, 1945 |
| 2,384,115 | Muskat et al. | Sept. 4, 1945 |
| 2,455,652 | Bralley | Dec. 7, 1948 |
| 2,479,522 | Strain | Aug. 16, 1949 |